United States Patent [19]

Rosa

[11] 4,047,094
[45] Sept. 6, 1977

[54] MHD GENERATOR WITH IMPROVED NETWORK COUPLING ELECTRODES TO A LOAD

[75] Inventor: Richard J. Rosa, Bozeman, Mont.

[73] Assignee: The United States of America as represented by the United States Energy Research and Development Administration, Washington, D.C.

[21] Appl. No.: 707,925

[22] Filed: July 22, 1976

[51] Int. Cl.² .............................................. H02N 4/02
[52] U.S. Cl. ............................................ 322/7; 310/11
[58] Field of Search ............................... 310/11; 322/7

[56] References Cited
U.S. PATENT DOCUMENTS

| | | | |
|---|---|---|---|
| 3,368,089 | 2/1968 | Klein ..................................... | 310/11 |
| 3,524,086 | 8/1970 | Lindley .................................. | 310/11 |
| 3,792,340 | 7/1974 | Sheinkmar et al. ................ | 310/11 X |
| 3,940,639 | 2/1976 | Enos et al. ............................. | 310/11 |
| 3,940,640 | 2/1976 | Petty et al. ............................. | 310/11 |

Primary Examiner—Donovan F. Duggan
Attorney, Agent, or Firm—Dean E. Carlson

[57] ABSTRACT

An MHD generator has a plurality of segmented electrodes extending longitudinally of a duct, whereby progressively increasing high DC voltages are derived from a set of cathode electrodes and progressively increasing low DC voltages are derived from a set of anode electrodes. First and second load terminals are respectively connected to the cathode and anode electrodes by separate coupling networks, each of which includes a number of SCR's and a number of diode rectifiers.

8 Claims, 3 Drawing Figures

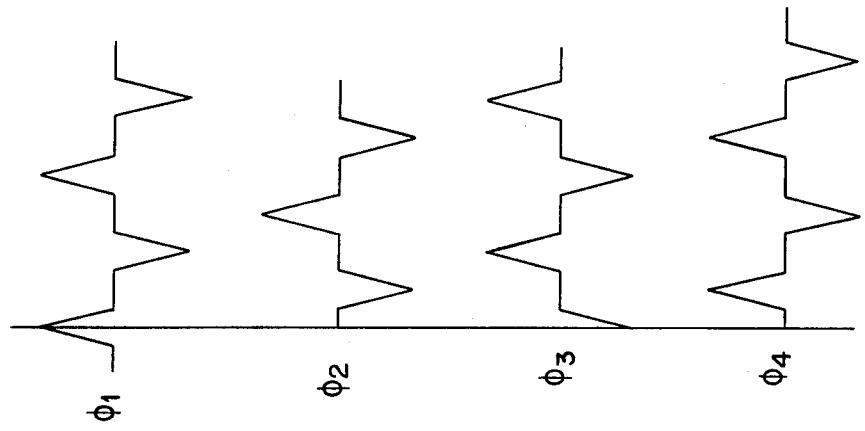
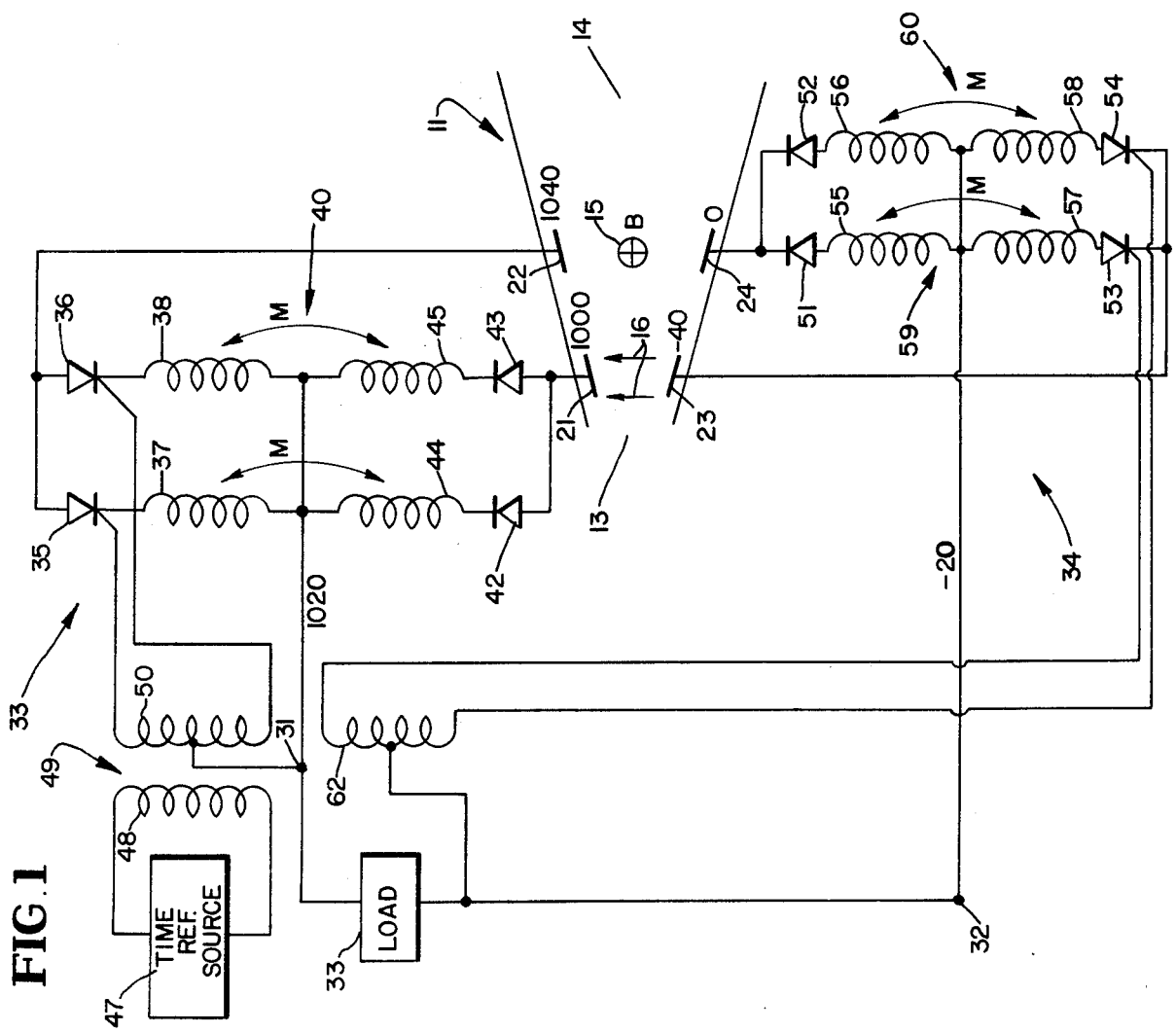

MHD GENERATOR WITH IMPROVED NETWORK COUPLING ELECTRODES TO A LOAD

FIELD OF INVENTION

The present invention relates generally to networks for feeding current from a magnetohydrodynamic generator (hereinafter an MHD generator) to a load and more particularly to a network wherein a plurality of electrodes of the generator are connected to a common terminal through a controlled switch and a rectifier that are inductively coupled together.

BACKGROUND OF THE INVENTION

Conventional MHD generators generally comprise a divergent duct or channel through which a high temperature plasma flows to induce different voltages in a plurality of segmented Faraday electrodes that are positioned at different longitudinal positions along the length of the duct. The voltages are induced as a result of an interaction between the plasma and a magnetic field that extends through the duct, at right angles to the direction of plasma flow. The segmented electrodes are positioned on opposite sides of the duct relative to the magnetic field, whereby there are induced progressively larger, positive high voltages on cathode electrodes positioned along one side of the duct; similarly, progressively larger relatively low DC voltages are induced in anode electrodes positioned on the opposite side of the duct.

In a full scale utility-power plant MHD generator, there might be on the order of one thousand pairs of anodes and cathodes and a resulting one thousand pairs of output leads. In the past, it has been the general practice to assume an inverter for each output lead and an output transformer winding for each of the inverters. While certain circuit configurations, such as the diagonal configuration, have been designed to reduce, to a certain extent, the number of output leads and transformer windings, the number of such leads and windings remains relatively high. The principal disadvantage of the multiple outputs are the requirements for a large number of separate inverters and a relatively expensive multiwinding power output transformer.

It is, accordingly, an object of the present invention to provide a new and improved network for coupling multiple electrodes of an MHD generator (of either the Faraday or diagonal configuration) to a load wherein the number of separate inverters and primary windings and terminals needed on a main power transformer is substantially reduced.

SUMMARY OF THE INVENTION

In accordance with the present invention, these objectives are achieved by providing a coupling network between one set of the MHD generator electrodes and a common output terminal, wherein the network includes a number of diode rectifiers and controlled switches which are inductively coupled together in pairs. The rectifier and switch of each pair are connected to a pair of electrodes in which are induced voltages having values on opposite sides of the voltage at which the common terminal is maintained. The controlled switch is of the type that remains conducting, once activated into a conducting state by a control voltage, until there is a reversal in the direction of current flowing through high current electrodes thereof; hence, the controlled switch is preferably a silicon controlled rectifier (SCR), or the like. The diode rectifier is normally back biased so that current does not flow through it, while the SCR is connected to that current flow through it in response to a control voltage being applied to a control electrode thereof. The inductive coupling between the SCR and diode rectifier is such that a change in state of the SCR, from non-conducting to conducting, causes the diode rectifier to become conducting. In response to a collapse of the inductive magnetic flux coupling the controlled switch and the diode rectifier, which occurs when the SCR current becomes constant, the diode is again back biased and current flow through it is cut off. The SCR's are activated in sequence, so that as one SCR becomes conducting its neighbor is cut off by suitable circuitry. Inductive coupling between the rectifier and controlled switches of each pair only requires the relatively low current of one pair of electrodes. The currents flowing through several of the circuits, of the type described, are summed together on the common output terminal via a DC path.

To maximize the current capability and reduce ripple, a pair of parallel SCR-diode circuits is provided for each pair of cathode electrodes and each pair of anode electrodes. The separate SCR's of the parallel paths are activated at mutually exclusive times to provide full waiver inversion. Even less overall ripple is obtained by activating the networks associated with the different electrodes at different displaced time positions, in a manner similar to a multiphase inverter network. In general, for a generator having N cathodes and N anodes (where N = an even integer) or for a generator having (N+1) of each type of electrode, the SCR's can be activated in response to an N phase reference source, if minimum ripple is to be attained.

It is, accordingly, another object of the invention to provide a new and improved network for connecting multiple electrodes of an MHD generator to a load via a number of switches that are activated on a multiphase basis to minimize ripple.

As required by the law of energy conservation, the common terminals for the cathodes and anodes are respectively maintained at voltages that are equal to the average of the cathode voltages and the anode voltages. Hence, if an odd number of cathode electrodes and anode electrodes is provided, the common terminal for the cathode voltages is at the same voltage as the center cathode electrode, while the common terminal for the anode electrodes is at the same voltage as the center anode voltage.

The above and still further object, features and advantages of the present invention will become apparent upon consideration of the following detailed description of several specific embodiments thereof, especially when taken in conjunction with the accompanying drawing.

BRIEF DESCRIPTION OF THE DRAWING

FIG. 1 is a circuit diagram of one embodiment of the invention employing an even number of cathode and anode electrodes;

FIG. 3 illustrates waveforms of control voltages for the SCR's of FIG. 2.

DETAILED DESCRIPTION OF THE DRAWING

Figure 2:
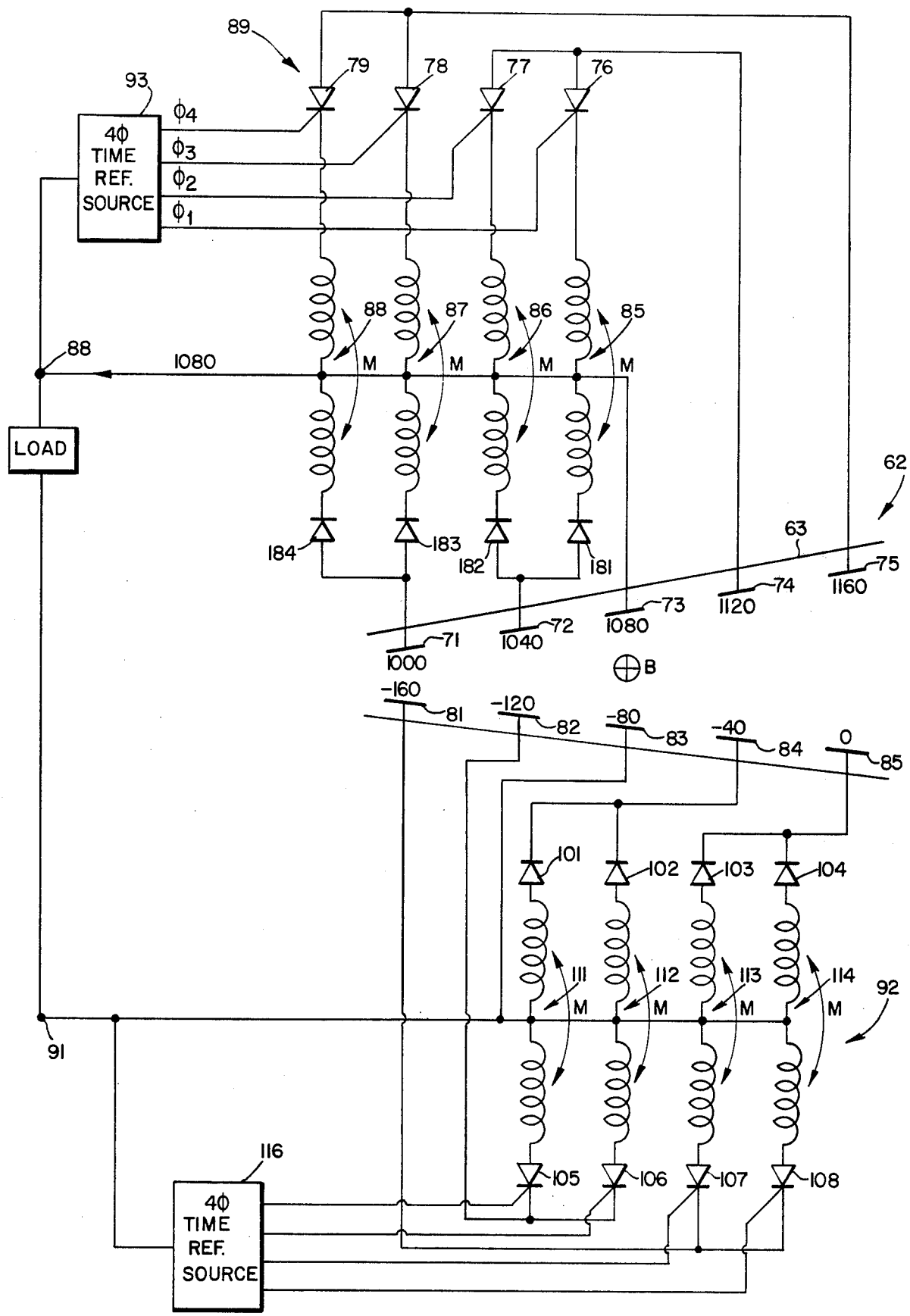
FIG. 2 is a schematic diagram of a second embodiment of the invention employing an odd number of cathode and anode electrodes.

Reference is now made to FIG. 1 of the drawing wherein there is illustrated in simplified form what is now considered to be a conventional MHD generator 11 that comprises a generally divergent duct 12 into which a high temperature plasma is applied under pressurre to inlet 13 and is withdrawn at outlet 14. The plasma typically has a temperature on the order of 3000° K and is under a pressure on the order of 10 atmospheres. Because of the high temperature, pressure, and composition of the plasma, it is electrically conductive, typically having a conductivity in the order of 10 mhos per meter. A magnetic field coil (not shown) is connected to a DC source to produce a DC magnetic field transverse to the direction of flow between inlet 13 and outlet 14; the magnetic field is indicated by arrow 15 and extends at right angles to the plane of the paper in FIG. 1. The magnetic field interacts with the plasma to produce an electromotive force, indicated by arrows 16, at right angles to both the direction of magnetic field 15 and the direction of plasma flow. The flow of plasma from inlet 13 to outlet 14 in the presence of the magnetic and electric fields indicated by arrows 15 and 16 results in a separation of negative and positive charges in the plasma, whereby there subsists a substantial gradient along the length of duct 11 between the inlet to the outlet. This potential gradient is known as the "Hall Potential", whereby the value of potential toward inlet 13 is less than the potential toward outlet 14.

To enable the voltages along the length of duct 12, as well as those across the width of the duct, to be converted into power that can be supplied to a load, generator 11 is provided with a multiplicity of segmented cathode and anode electrodes. In the exemplary, simplified situation illustrated in FIG. 1, a pair of cathode electrodes 21 and 22 and a pair of anode electrodes 23 and 24 are provided. In an actual device, there are many more electrodes. Relatively high DC voltages are induced in cathode electrodes 21 and 22, while relatively DC low voltages are induced in anode electrodes 23 and 24; in the situation illustrated, it is assumed that the voltages induced in segmented Faraday electrodes 21 and 22 are +1000 and +1040 volts DC, respectively, while the voltages induced in anode electrodes 23 and 24 are −40 and 0 volts DC, respectively. Electrodes 21 and 23 are oppositely spaced from each other to intercept opposite ends of the same current vector, while electrodes 22 and 24 are oppositely disposed from each other.

In accordance with the present invention, the voltages induced in electrodes 21 and 22 are coupled via DC inverter network 33 to a common output, load terminal 31 that is maintained at a voltage equal to the average voltage of the cathode electrodes; similarly, the anode electrodes are coupled via DC inverter network 34 to a common output, load terminal 32, that is maintained at a voltage equal to the average of the voltages induced on the anode electrodes. Hence, for the particular situation illustrated in FIG. 1, load terminals 31 and 32 are respectively maintained at voltages of +1020 and −20 volts DC. Connected across terminals 31 and 32 is a load 33, typically a high voltage, power inverter feeding an AC load.

Networks 33 and 34 respectively establish DC circuits from electrodes 21 and 22 to terminal 31 and from electrodes 23 and 24 to terminal 32. Network 33 includes a full wave controlled, inverter switch connected to electrodes positioned in duct 11 toward outlet 14, as well as a pair of power diode rectifiers that are connected to the electrodes in the duct which are located toward inlet 13; network 34 is oppositely arranged whereby it includes an inverter switch connected to electrodes in duct 11 toward inlet 13 and power diode rectifiers that are connected to electrodes in the duct which are located toward outlet 14. The controlled switches and rectifiers are inductively coupled together so that as a change in the state of the controlled switches occurs in response to a control voltage, a normal back biased condition of the diode rectifiers is removed and the rectifiers become forward biased. The diodes remain forward biased until no substantial change in magnetic flux linking the controlled switches and rectifiers occurs, at which time the diode circuits are again biased into the back biased state. Back biasing of the diode rectifiers results in a back bias being applied to the controlled switches, whereby the switches are cut off; alternatively, the controlled switches are driven by an external commutating network of a known type such that the flow of current through a controlled switch causes its neighboring controlled switch to be cut off. Since such commutating networks for sequential deactivation of controlled switches are well known to those skilled in the art, there is no specific illustration of one herein.

Network 33 includes a pair of SCR's 35 and 36 having anode cathode paths connected in parallel DC circuits between electrode 22 and terminal 31. The anode of SCR's 35 and 36 are connected in parallel to electrode 22, while the cathodes of the SCR's are respectively connected to one terminal of each of windings 37 and 38 of isolation transformers 39 and 40. The other terminals of windings 37 and 38 are connected to common load terminal 31.

Network 33 also includes power diode rectifiers 42 and 43 that are connected in parallel DC circuits between electrode 21 and terminal 31. The anodes of diodes 42 and 43 are connected to electrode 21, while the cathodes of the two diodes are respectively connected to one terminal of each of coils 44 and 45 of transformers 39 and 40. The other terminals of coils 44 and 45 have a common connection with each other and terminal 31, as well as the common terminals of windings 37 and 38.

The control or gate electrodes of SCR's 35 and 36 are energized by control voltages that are displaced 180° from each other if single phase, full-wave rectification is employed, or a smaller angle if polyphase rectification is used, so that current flows through the two SCR's during mutually exclusive time intervals. The 180° phase displacement for the control voltages of SCR's 35 and 36 is derived from a pulse type time reference source 47, having output terminals that are connected across opposite ends of primary winding 48 of transformer 49 having a center tapped secondary winding 50. Terminals at the opposite ends of secondary winding 50 are connected to the gate electrodes of SCR's 35 and 36, while the center tap of the winding is connected to the terminal 31 to provide a reference voltage for triggering the two SCR's. The opposite terminals of secondary winding 50 apply positive voltage pulses to the control electrodes of SCR's 35 and 36; the pulses are displaced 180° from each other during each cycle of source 47. SCR's 35 and 36 are biased by the voltage between electrode 22 and terminal 31 so that they conduct immediately in response to a positive pulse being applied to their gate electrodes. SCR's 35 and 36 remain conducting even after the positive pulses are no longer applied to the gate electrodes thereof, until the anode cathode voltage thereof drops below an extinguishing voltage, on the order of zero volts. In contrast, diodes 42 and 43 are normally back biased by their connection between electrode 21 and terminal 31.

Network 34 is similar to network 33 except that the connections for power diode rectifiers 51 and 52 and SCR's 53 and 54 are reversed in polarity. In particular, the cathodes of SCR's 53 and 54 are connected to electrode 23, while the cathodes of normally back biased diodes 51 and 52 are connected to electrode 24. The anodes of diodes 51 and 52 are connected via coils 55 and 56 of isolation transformers 59 and 60 to terminal 32, while the anodes of SCR's 53 and 54 are connected via coils 57 and 58 of these transformers to terminal 32. The gate electrodes of SCR's 53 and 54 are inductively coupled to primary winding 48 of transformer 49 by secondary winding 62, having a center trap that is connected to terminal 32 for voltage reference purposes.

In operation, initially assume that positive pulses are applied to the gate electrodes of SCR's 35 and 53, whereby current flows from electrode 22 through SCR 35 and winding 37 to terminal 31, thence through load 33 and terminal 32 to winding 57 and SCR 53 to electrode 23. In response to the current flowing through coils 37 and 57, there is a change in the magnetic flux linking coils 37 and 44, simultaneously with a change in the magnetic flux linking coils 55 and 57. In response to the changing magnetic flux coupled to coils 44 and 55, these coils have voltages induced therein to overcome the back bias applied to diodes 42 and 51; hence, a voltage drop is induced in winding 44 relative to terminal 31 and a voltage increase is induced in winding 55 relative to terminal 32. Diodes 42 and 51 both become conducting so current also flows from electrode 21 to electrode 24 via these diodes, terminals 31 and 32, as well as load 33. Since SCR's 35 and 53 as well as diodes 42 and 51 are all in a conducting state, the current supplied to terminal 31 is equal to the sum of the currents applied by electrodes 21 and 22 to diode 42 and SCR 35.

Diode 42 remains in a conducting state until the magnetic field coupling coil 44 to coil 37 begins to collapse, at which time diode 42 again becomes back biased and cuts off. In response to diode 42 cutting off, there is induced in winding 37 a voltage which has a tendency to overcome the forward anode cathode voltage of SCR 35, whereby the SCR has a tendency to be activated into a cutoff state. The frequency of time reference source 47 is such that pulses are applied to the gates of SCR's 36 and 52 as diodes 42 and 53 become cut off. If necessary, to assure cut off of SCR 35, a commutation circuit (not shown) can be provided to apply a back bias to SCR 35 in response to current flow through SCR 36. There is a corresponding sequence of operations for the coupling of flux between windings 55 and 57 so that SCR 53 and diode 51 conduct and cut off at the same time as SCR 35 and diode 42. Thereby, a complete path is provided between electrodes 21 and 22 and electrodes 23 and 24 through terminals 31 and 32, as well as load 33, in response to a positive variation in the output of time reference source 47.

During the next half cycle of source 47, which begins when positive pulses are applied by windings 50 and 62 to the control electrodes of SCR's 36 and 54, these two SCR's conduct to cause conduction of diodes 43 and 52, in the manner stated supra with regard to SCR's 35 and 53 and diodes 42 and 51. Hence, it is seen that a full wave rectified current is supplied by generator 11 to load 33 without the requirement for a transformer that handles all of the current derived from the generator.

The principles of the invention are also applicable to a multiphase (i.e., more than single phase) situation, as well as to generators having an odd number of cathodes and anodes. Such a situation is illustrated in the circuit diagram of FIG. 2.

In FIG. 2, duct 63 of generator 62 is provided with five high voltage cathodes 71, 72, 73, 74 and 75 on which are induced progressively higher positive DC voltages of +1000, +1040, +1080, +1120, and +1160 volts respectively. On the side of duct 63 opposite from the cathodes, relatively low voltage anode electrodes 81-85 are provided; progressively higher DC voltages of −160, −120, −80, −40 and 0 volts are respectively induced on electrodes 81, 82, 83, 84 and 85. Electrodes 71-75 are connected in parallel DC paths to common terminal 88 via network 89, while electrodes 81-85 are connected in parallel DC paths to terminal 91 via network 92. There is a direct connection between electrodes 73 and 83 to terminals 88 and 91, respectively, whereby these terminals are maintained at the DC voltage levels of electrodes 73 and 83, i.e., at 1080 volts and −80 volts DC respectively. Terminals 88 and 91 are thereby maintained at the average voltages of the cathode and anode electrodes within generator 62.

Network 89 includes eight additional branches, four of which include SCR's 76-79 and the remaining four of which include diode power rectifiers 181-184. The branches including SCR's 76-79 are inductively coupled to the branches includes diodes 181-184 by isolation transformers 85-88, respectively. The branches containing windings 85 and 86 constitute one single-phase full wave circuit and the two branches containing windings 87 and 88 comprise another. The gate electrodes of SCR's 76-79 are responsive to a four phase time reference source 93 that applies constant frequency waveforms to the gate electrodes of the SCR's; the waveforms applied to the gate electrodes of SCR's 76, 78, 77 and 79 are illustrated in FIG. 3 and are respectively indicated by $\phi1$, $\phi2$, $\phi3$ and $\phi4$ so that the SCR's 76, 78, 77 and 79 are fired in sequence in the named order. The inductive coupling of transformers 85-88 results in the conduction of diodes 181-194 and the tendency for SCR's 76-79 to cut off in a similar manner as indicated supra with regard to conduction of the diodes and SCR's of FIG. 1. If necessary, commutation circuits (not shown) are provided to cut off SCR's 76-79 as each neighboring SCR becomes conducting. SCR's 76 and 77 are activated into a conducting state at mutually exclusive times, while SCR's 78 and 79 are activated into conducting states at mutually exclusive times, with conduction of SCR's 76 and 77 following immediately after cut-off of each other and condution of SCR's 78 and 79 following immediately after each other. The conduction intervals of SCR's 76 and 78 are displaced from each other by one-quarter cycle of source 93, while the conducting intervals of SCR's 77 and 79 are displaced from each other by one-quarter of a cycle of source 93.

The several branches of network 89 are connected to electrodes 71-75 in such a manner that the average voltage coupled across a pair of branches that are inductively coupled together is equal to the voltage on the center cathode 73. Hence, diodes 181 and 182 are connected to cathode 72, while SCR's 76 and 77 are connected to cathode 74; the average voltage of electrodes 72 and 74 is (1040 + 1120)/2 = 1080 volts, the voltage of electrode 73. Similarly, diodes 183 and 184 are both connected to 1000 volt electrode 71, while SCR's 78 and 79 are both connected to 1160 volt electrode 75; the average voltage of electrodes 71 and 75 is 1000 + 1060)/2 = 1080 v.

In a similar manner, network 92 includes eight branches, four of which include diodes 101–104 and another four of which include SCR's 105–108. The branches including diodes 101–104 are inductively coupled to the branches including diodes SCR's by isolation transformers 111–114. Diodes 101–104 and SCR's 105–108 are connected in an opposite manner to terminal 91 and electrodes 81–85 relative to the connections of the diodes and SCR's of network 89 to terminal 88 and electrodes 71–75. This is because network 92 is connected to the low voltage anode electrodes, while network 89 is connected to the high voltage cathode electrodes of generator 62. SCR's 105–108 are driven by four phase time reference source 116, whereby the gate electrodes of SCR's 105, 106, 107 and 108 are driven in response to the outputs of time reference source 116 respectively designated as $\phi 1$, $\phi 3$, $\phi 2$, and $\phi 4$. If necessary, commutating circuits (not shown) can be connected between SCR's 105–108 to cut-off an SCR that is in a conducting state when its neighboring SCR is activated into a conducting state in response to its gate being supplied with a pulse.

The connections between the SCR's and diodes of network 92 and electrodes 81–85 are similar to the connections for network 89, with regard to the average value of the voltage applied to all of the branches being equal to the voltage on the center anode electrode 83.

From the foregoing, it is believed evident as to the manner in which the teachings of the present invention can be extended to any number of anode and cathode electrodes, whether the number of cathode or anode electrodes is even or odd. Generalizing, it is seen that there are M cathode electrodes that generate voltages on one side of the voltage at which the common cathode terminal is maintained and there are M cathode electrodes that generate voltages on the other side of the common cathode terminal voltage, where M is a positive integer. The electrodes that generate voltages on the one side are connected to the controlled switches while the electrodes that generate voltages on the other side are connected to the rectifiers. The $k$th switches and $k$th rectifiers are inductively coupled together, where $k$ is every integer from 1 through M. A similar relationship exists for the anode electrodes. If there is an even number of electrodes in each set there is a total of 2M cathodes and 2M anodes; if there is an odd number of electrodes for each set there is a total of (2M+1) cathodes and (2M+1) anodes, with the center electrode of each set being connected directly to the common terminal for the particular set.

Also, it is believed evident as to the manner in which the networks connecting the cathode and anode electrodes to common terminals can be driven by a multiphase source. Generalizing, a different phase of a 2M phase time reference source is connected to the control electrode of each of the different 2M switches provided in each of the networks for the sets of cathode and anode electrodes so that current begins to flow in each of the switches of a particular network at a different time. Current flows simultaneously in half of the switches and approximately half of the diodes at a particular time while the remaining switches and diodes are cut off. It is to be understood, however, that multiple (more than two) SCR's of each network can be driven by a biphase source, as illustrated in connection with FIG. 1. In one embodiment, 60 Hertz waveforms are applied to the control electrodes of the SCR's, whereby a 120 Hertz full wave rectified current is applied to the load. However, it may be advantageous to employ a higher frequency to energize the SCR's since a higher frequency allows more compact and economical components to be used and because the switching frequency of the SCR's is typically not coupled to the load since the load is driven through a high voltage power inverter responsive to the full wave rectified current.

The required capacity of the current handling networks of the present invention can be noted from the following analysis, wherein it is assumed that the voltage between adjacent electrodes ($\Delta V_x$) is the same and the current (I) induced in each electrode is the same. In particular, the total power $P_C$ handled by the two networks responsive to N electrode pairs (i.e., on both the cathode and anode sides) is:

$$\pi_c = 2 \sum_{n=1}^{N} (n-1) \Delta V_x I \qquad (1)$$

The factor two occurs in Equation (1) since separate networks are provided for the cathode and anode sides of the generator, as well as because substantially equal currents are handled by the SCR and rectifier branches that are coupled together. The total power output of the N electrode pairs is:

$$\Pi_{tot} = NIV_y \qquad (2)$$

where:
$V_Y =$ the average cross-duct voltage subsisting between opposed anode and cathode electrodes of the duct. The fraction of total power handled by the networks relative to the power supplied by the networks to the load is:

$$\frac{\pi_c}{\pi_{tot}} = \frac{2\Delta V_x \sum_{n=1}^{N}(n-1)}{V_y \; N} = \frac{\Delta V_x}{V_y}(N-1) \qquad (3)$$

For a typical situation, wherein $\Delta V_X = 40$ volts and $V_y = 4000$ volts, $$\frac{\pi_c}{\pi_{tot}} \text{ (percent)} = (N-1) \qquad (4)$$

For practical values of N, such as 10, it is seen that the fraction of total power handled by the network is relatively small.

While there have been described and illustrated several specific embodiments of the invention, it will be clear that variations in the details of the embodiments specifically illustrated and described may be made without departing from the true spirit and scope of the invention as defined in the appended claims.

What is claimed is:

1. In combination with an MHD generator having a plurality of segmented electrodes extending longitudinally of a duct whereby progressively increasing high DC voltages are derived from a set of cathode electrodes of the generator and progressively increasing low DC voltages are derived from a set of anode electrodes of the generator, a first common terminal for the high voltage cathode electrodes, a second common terminal for the low voltage anode electrodes, said common terminals adapted to be normally maintained at predetermined voltages and to be connected across a load for the generator, a network for coupling one of said sets of electrodes to one of said terminals comprising: a controlled switch connected between a first electrode of the one set and said one common terminal, a rectifier connected between a second electrode of the one set and said one common terminal, said first and second electrodes having voltages on opposite sides of the voltage of said one common terminal, said rectifier being connected so that it is normally cut off by the voltage between the second electrode and said one common terminal, said switch being connected so that it is normally conductive between the first electrode and said one common terminal once it has been triggered into a conducting state in response to a control signal, and means for inductively coupling the switch and rectifier together so that the rectifier is biased into a conducting state in response to a change in the current flow through the switch.

2. In combination with an MHD generator having a plurality of segmented electrodes extending longitudinally of a duct whereby progressively increasing high DC voltages are derived from a set of cathode electrodes and progressively increasing low DC voltages are derived from a set of anode electrodes, first and second common terminals being respectively provided for the cathode and anode electrodes, said common terminals adapted to be maintained at predetermined voltages and to be connected across a load, N first electrodes of each set generating a voltage having a value on one side of the voltage for the common terminal of that set, N second electrodes of each set generating a voltage having a value on the other side of the voltage for the common terminal of that set, where N is any positive integer, first and second networks for respectively connecting the set of cathode electrodes to the first common terminal and the set of anode electrodes to the second common terminal, each of said networks including: N controlled switches and N diode rectifiers, the $k$th switch being connected between the $k$th first electrode and the common terminal for the set of electrodes for the network, the $k$th diode being connected between the $k$th second electrode and said common terminal, where $k$ is every integer from 1 through N, means for activating the N switches into a conducting state, the polarity connection of each of said rectifiers being such that it is normally cut off by the voltage between the second electrode to which it is connected and said common terminal, the polarity connections of each of said switches being such that it is normally conductive between the first electrode to which it is connected and said common terminal once it has been activated into a conducting state in reponse to a control signal, and means for inductively coupling the $k$th switch and $k$th rectifier together so that the $k$th rectifier is biased into a conducting state in response to a change in current flow through the $k$th switch.

3. The apparatus of claim 2 wherein the voltages generated at the electrodes of each set and the connection between the electrode of each of set and each of the common terminals are such that the average voltage of each set is equal to the voltage of the common terminal for that set.

4. The apparatus of claim 3 wherein only 2N electrodes are provided in each set.

5. The apparatus of claim 3 wherein only (2N+1) electrodes are provided in each set, one of said electrodes of each set being connected directly to the common terminal for that set to maintain the common terminal at the voltage of said one electrode.

6. The apparatus of claim 2 wherein a pair of parallel switches and a pair of parallel rectifiers are respectively connected to each of the first and second electrodes of each set, whereby 2N switches and 2N rectifiers are provided in each network, each switch and rectifier being separately inductively coupled together, and means for activating the parallel switches connected to the $k$th first electrode of each set so that the parallel switches for a particular electrode conduct at mutually exclusive times.

7. The apparatus of claim 6 wherein the means for activating includes a 2N phase source for activating each of the 2N switches so that each begins to conduct at a different time and at least some of the switches connected to different first electrodes of each set conduct simultaneously.

8. The apparatus of claim 2 wherein each of the switches is an SCR.

* * * * *